United States Patent
Rana et al.

(10) Patent No.: US 7,764,697 B2
(45) Date of Patent: Jul. 27, 2010

(54) METHOD FOR DETECTING AND HANDLING ROGUE PACKETS IN RTP PROTOCOL STREAMS

(75) Inventors: Aswinkumar Vishanji Rana, Plano, TX (US); Darren Bensley, McKinney, TX (US)

(73) Assignee: Audiocodes, Inc., Plano, TX (US)

( * ) Notice: Subject to any disclaimer, the term of this patent is extended or adjusted under 35 U.S.C. 154(b) by 1716 days.

(21) Appl. No.: 10/940,908

(22) Filed: Sep. 14, 2004

(65) Prior Publication Data

US 2006/0056391 A1    Mar. 16, 2006

(51) Int. Cl.
*H04L 12/28* (2006.01)
(52) U.S. Cl. .................. 370/401; 370/392; 713/164; 713/201
(58) Field of Classification Search .............. 370/352, 370/260, 389, 401, 392; 713/201; 201/164
See application file for complete search history.

(56) References Cited

U.S. PATENT DOCUMENTS

| 2005/0076238 A1* | 4/2005 | Ormazabal et al. .......... 713/201 |
| 2005/0083912 A1* | 4/2005 | Afshar et al. ............... 370/352 |
| 2005/0190756 A1* | 9/2005 | Mundra et al. .............. 370/389 |

* cited by examiner

*Primary Examiner*—Fan Tsang
*Assistant Examiner*—Simon King
(74) *Attorney, Agent, or Firm*—Haynes and Boone, LLP

(57) ABSTRACT

A method is described for detecting rogue packets in real-time protocol ("RTP") data streams. Rogue packets occur due to a malfunctioning device continuing to send RTP packets after the termination of the media session, or by third party devices due to malfunction or malicious activity. The method recognizes rogue RTP packets by examining identifying fields in each packet associated with the RTP stream. The fields can be in the header of the packet or in the payload, and can include information such as destination address, destination port, protocol, sequence number, SSRC number, and others. Once rogue activity is detected the method can quarantine the associated pinhole information and/or alert a network operator.

19 Claims, 4 Drawing Sheets

METHOD FOR DETECTING AND HANDLING ROGUE PACKETS IN RTP PROTOCOL STREAMS

TECHNICAL FIELD OF THE INVENTION

The present invention relates to broadband data networking equipment. Specifically, the present invention relates to a method of detecting rogue packets in real time protocol ("RTP") streams, and handling those packets and sessions.

BACKGROUND OF THE INVENTION

RTP is the Internet-standard protocol for the transport of real-time data, including audio and video. It can be used for media-on-demand as well as interactive services such as Internet telephony. RTP is a thin protocol providing support for applications with real-time properties such as continuous media (e.g., audio and video), including timing reconstruction, loss detection, security and content identification.

As mentioned, one application for RTP is Internet telephony also referred to as Voice over Internet Protocol, ("VoIP"). There are several VoIP protocols that make use of RTP. These protocols include both a signaling channel for transmitting and receiving control information related to the call and a bearer channel for the actual voice component of the call. These protocols are H.323 and H.248, Media Gateway Control Protocol (MGCP) and Session Initiation Protocol (SIP). The signaling protocol is a separate session from the media, or voice, stream and includes in its payload (as opposed to its header) an IP address and port destination of where to send the media stream while the media (voice) will be carried using Real Time Protocol (RTP).

Problems can occur with the RTP streams used in real time media, such as VoIP, when unanticipated, or rogue, packets are found in the RTP streams. An example of such rogue packets includes packets that are received after RTP stream has been supposedly terminated by the appropriate signal on the control channel. Another example involves rogue packets from an unanticipated source received at the same time as packets are being sent and received in an authentic RTP stream.

The problem is particularly apparent at network address translation/network address and port translation ("NAT/NAPT") devices used between public and private Internet Protocol ("IP") domains. These devices translate private IP addresses into public IP addresses (and vice versa), and create pinholes by allowing traffic on authorized addresses and ports and blocking traffic on unauthorized addresses and ports. Rogue RTP packets occur when a device on one end of the RTP stream functions improperly and continues to transmit data after the real time media session it is associated with has been terminated. The primary concern with this type of rogue packets is if the NAT/NAPT device sees the termination of the real time media session by watching the control stream, it would normally release the address and port associated with the pinhole for the RTP stream. If that address and port are then reused for a separate session while rogue packets are still being sent from the previous malfunctioning device, the new session will be corrupted by the rogue packets.

In addition to a malfunctioning device, rogue packets can be generated from a hostile source for malicious purposes. This presents a security threat, as a normal NAT/NAPT device would not recognize the rogue packets using an authorized pinhole.

Accordingly, what is needed is a method for recognizing and handling rogue RTP packets in the network.

SUMMARY OF THE INVENTION

The present invention provides methods for detecting rogue RTP packets in real time media sessions. One method creates a pinhole for an RTP stream to carry the bearer traffic in a real time media session. The method then detects a signal to end the RTP stream, and further detects continuing packets on the pinhole. The method then quarantines the pinhole until no further rogue RTP packets are detected.

Another method creates a pinhole for an RTP stream, and then detects RTP packets conflicting with the expected RTP stream passing through the pinhole. The packets may be determined to be conflicting by looking at some combination of the source address, source port, destination port, destination address, or protocol, or by examining the RTP version number, SSRC number, or sequence numbers in the RTP packets. If conflicting packets are detected it is determined if the conflicting packets continue beyond an appropriate time frame. If the conflicting packets continue, the conflicting packets may be blocked, or an alarm may be sent to an operator or network administrator.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
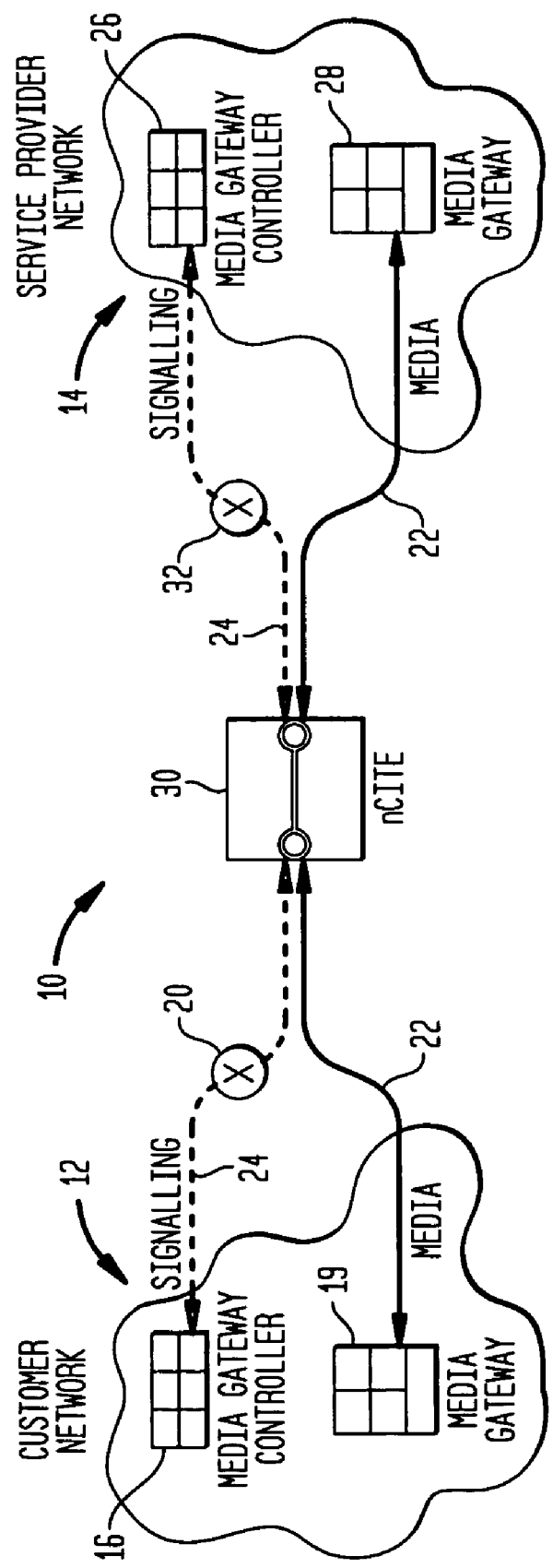
FIG. 1 is a simplified network diagram of a real time media stream having a control channel and an RTP media channel passing through a NAT/NAPT device.

Referring now to FIG. 1, a simplified network diagram is shown illustrating a real time media session between a public domain and a private domain through a NAT/NAPT device. Network 10 consists of private IP network 12 connected to public IP network 14 through NAT/NAPT device 30. The real time media session is comprised of signaling channel 24 through routers 20 and 32, and bearer channel 22 which is an RTP stream. Signaling channel 24 is formed by signaling messages that pass between media gateway controller 16 and media gateway controller 26 that set the parameters for bearer channel 22. Bearer channel 22, the RTP stream, passes between media gateway 18 and media gateway 28.

NAT/NAPT device 30 sits between private network 12 and public network 14 and acts as a firewall and to provide address/port translation. By performing NAT/NAPT translation, NAT/NAPT device 30 also acts to anchor the traffic passing between private network 12 and public network 14. NAT/NAPT device 30 is specifically designed to handle real time media applications, especially those with separate signaling and bearer channels as shown in network 10. NAT/NAPT device is capable of intercepting addresses and ports in the signaling messages used to set up the bearer channel and to translate those addresses to those necessary to set up the bearer channel. For a more complete description of the operation of such a NAT/NAPT device see U.S. patent application Ser. No. 10/657,813 filed Sep. 9, 2003.

While the invention can apply to any RTP stream and any real time session protocol, for illustrative purposes the present invention will make reference to real time session flows used by session initiation protocol ("SIP") for VoIP telephony. SIP uses an IP signaling channel to initiate and set the parameters for the voice stream which is carried by RTP. The signaling channel is also used to signal the end of the call, letting the end devices know to end the RTP streams.

Figure 2:
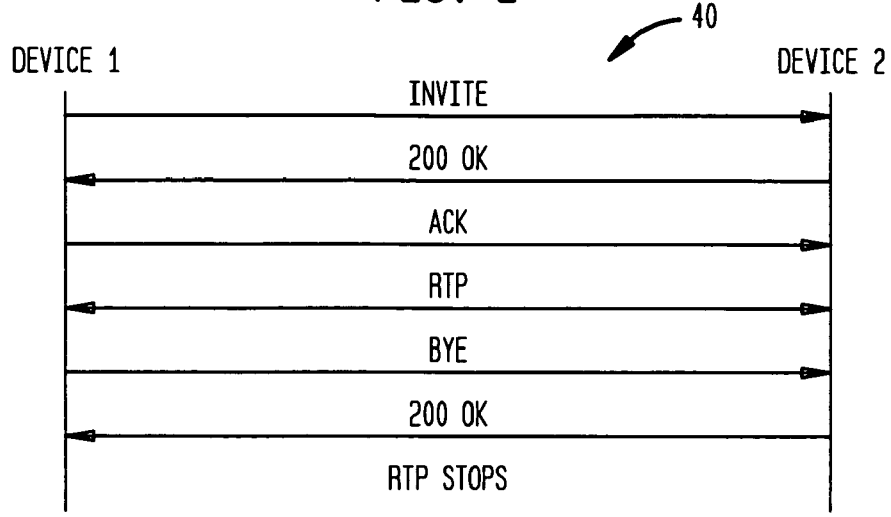
FIG. 2 is a signaling diagram for a real time media session using RTP as the bearer channel.

Referring now to FIG. 2, a simplified SIP call flow 40 is shown between device 1 and device 2 across a network such as network 10 in FIG. 1 where device 1 may be an telephone, either IP or PSTN, connected to private network 12 through media gateway 18, and device 2 may be a second telephone connected to public network 14 through media gateway 28. Device 1 initiates a call by sending a SIP INVITE message over the signaling channel. Device 2 responds by sending a SIP 200 OK message which is followed by an ACK message from Device 1.

After the ACK is sent and received, device 1 and device 2 establish the RTP stream which carries the media, in this case a voice call. When the voice call is complete and one party terminates the call, as by hanging up the IP telephone, shown here as device 1, a BYE message is generated and sent to the other IP telephone, here device 2. Device 2 then responds with a SIP 200 OK message and the RTP stream is terminated.

The example described with reference to FIG. 2 illustrates the proper operation of a SIP call and associated RTP stream.

Figure 3:
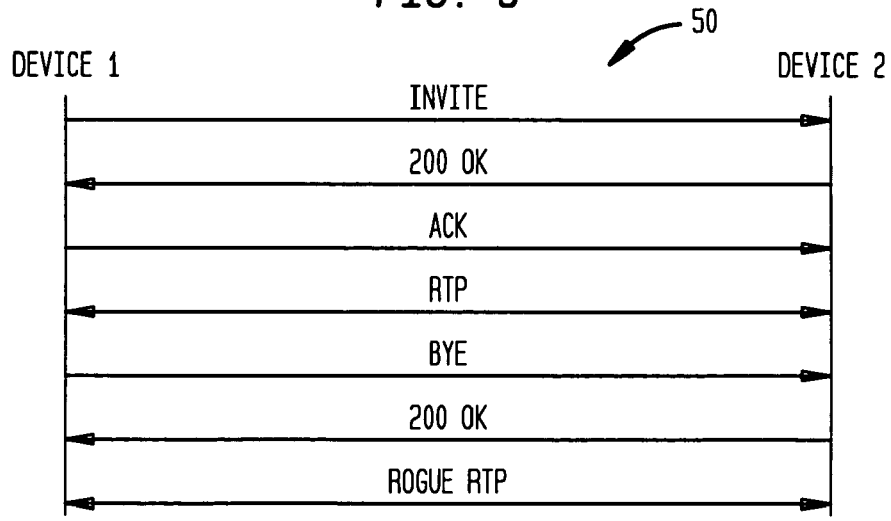
FIG. 3 is a signaling diagram of a real time media session with rogue RTP traffic caused by one or more malfunctioning devices.

Referring now to FIG. 3, a simplified SIP call flow 50 is shown illustrating one type of rogue RTP traffic. Call flow 50 begins with a SIP INVITE message from device 1 to device 2, which responds with the 200 OK message. After the SIP ACK message from device 1, the RTP media stream carrying the voice call is established between device 1 and device 2. As with reference to call flow 40 from FIG. 1, upon termination of the call a SIP BYE message is sent, shown here as generated by device 1, which is acknowledged by a 200 OK message. As described with reference to FIG. 2 the RTP stream should end, but instead rogue RTP traffic is shown continuing from one or both devices.

This rogue RTP traffic can cause problems if undetected. Once the BYE and 200 OK messages are detected by NAT/NAPT device 30, the NAT/NAPT device releases the address/port combination forming the pinhole, which means that the same pinhole could be opened for a new session. If a new session is begun with the same pinhole while there is still rogue RTP traffic from a prior call, the new session will be corrupted. The type of rogue RTP traffic in call flow 50 would most likely be caused by a malfunctioning device somewhere in the network that does not terminate the RTP stream when it should.

Figure 4:
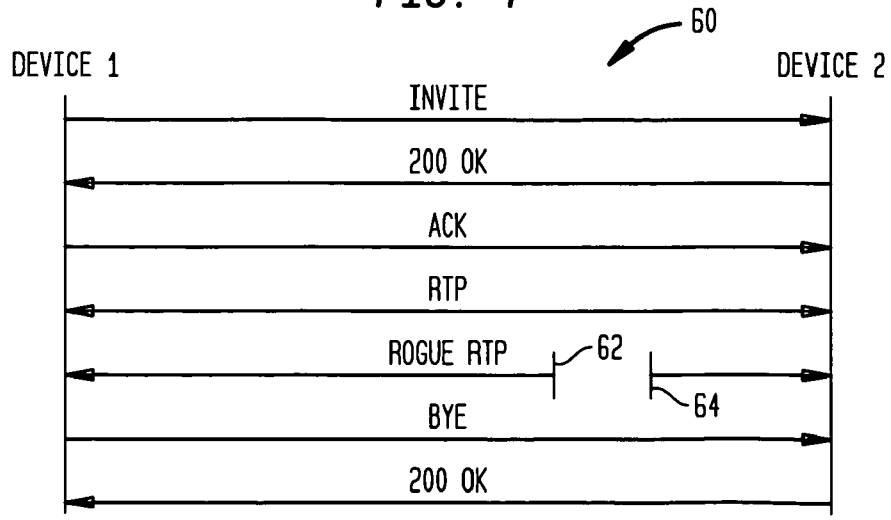
FIG. 4 is a signaling diagram of a real time media session with malicious rogue RTP traffic.

Referring now to FIG. 4, a simplified SIP call flow illustrating another type of rogue RTP traffic is described. Call flow 60 again begins with an INVITE message from device 1 with a 200 OK message returned from device 2. After the ACK message an RTP stream is established for the media portion of the call. In this case, instead of the RTP stream being seen after the call was terminated the rogue RTP stream is seen concurrently with the active RTP stream carrying the actual call. This rogue RTP traffic can be sent to either Device 1 or Device 2 and is generated from a source outside of the devices involved in the call, as shown by rogue sources 62 or 64 This can occur for several reasons.

One cause may be the malfunctioning device described with reference to FIG. 3 where call flow 60 was established using a pinhole that corresponded to a previous call that had a malfunctioning device that was still transmitting rogue RTP. Other causes may include the rogue RTP stream being sent from a malicious device attempting to use the pinhole to gain entry to the device on the private side of the network or to cause network problems by attacking the NAT/NAPT device 30.

Figure 5:
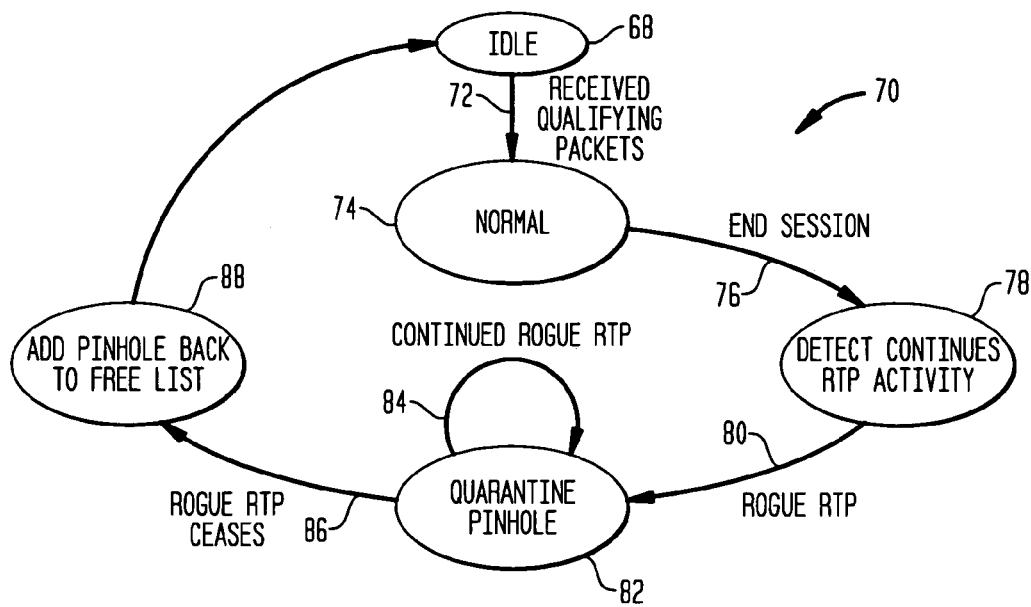
FIG. 5 is a flow chart showing the method of processing early rogue RTP traffic in accordance with the present invention.

Referring now to FIG. 5 a method is described that recognizes the type of rogue RTP packets described in FIG. 3 and prevents the pinhole address/port pair from being reused until the rogue RTP traffic stops. This method can be referred to as early rogue detection since the rogue traffic is recognized and prevented before it interferes with other sessions. Method 70 begins in idle state 68. When a real time media session with RTP traffic is established by receiving qualified packets 72, method 70 enters normal state 74. When an end of session message 76 is detected the method looks for continued RTP activity 78 for a predetermined amount of time. If rogue RTP traffic 80 is detected, the pinhole is quarantined 82 to prevent it from being used for other sessions. As long as continued rogue RTP traffic 84 is detected, the pinhole remains in the quarantined state 82. Once the rogue RTP traffic ceases 86 the pinhole is added back to the free list 88 and the method returns to idle state 68.

Figure 6:
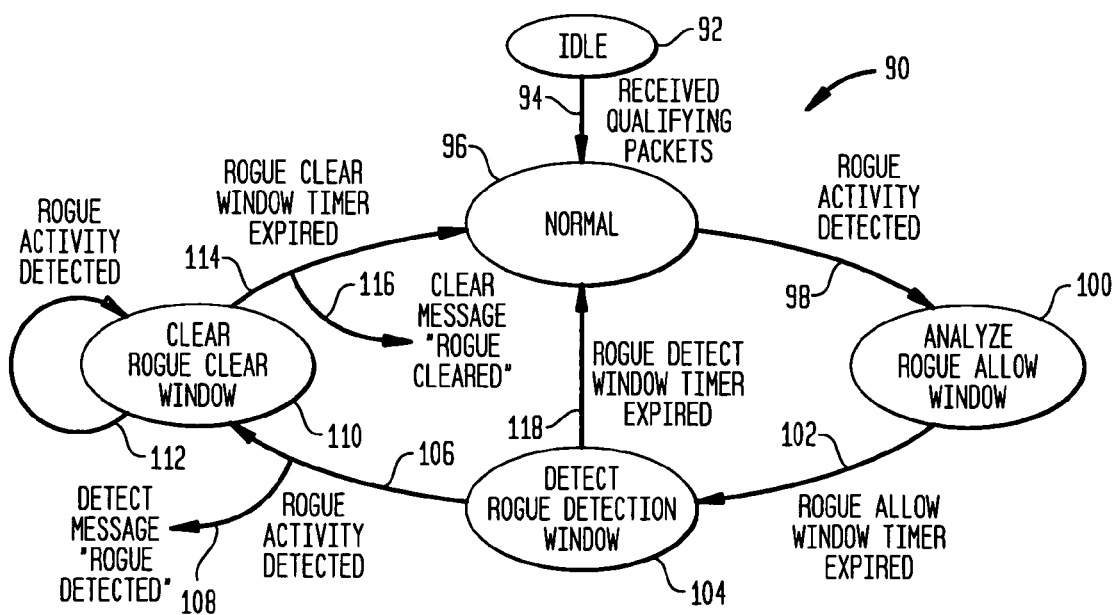
FIG. 6 is a flow chart showing the method of processing of late rogue RTP traffic in accordance with the present invention.

The second type of rogue RTP traffic described with reference to FIG. 4 is referred to as late rogue detection. Referring now to FIG. 6, a method of detecting and handling late rogue RTP traffic is described. Method 90 begins in idle state 92, when qualifying packets 94 are received the method moves to normal state 96. To detect rogue activity, such as that described in FIG. 4, the NAT/NAPT device 30 from FIG. 1 must analyze each packet forming the RTP stream. The NAT/NAPT device can use combinations from the header of each packet to determine if it belongs to the authorized RTP stream.

These combinations can include preferably three or more of the header fields such as the destination address, the destination port, the protocol, the source address or the source port. Packets having different header information than that found in the authorized packets would be identified as rouge RTP traffic. The NAT/NAPT device can perform further inspection of other attributes of the RTP packets to identify malicious, or spoofed, rogue RTP packets. The further inspection can include checking the RTP version number, looking for changes in the SSRC number, checking the sequence numbers of the RTP packets, or even checking the payload to make sure that the data type matches the authorized stream. For audio streams the codec type can be checked. Each additional check on the RTP packets makes it progressively harder for a spoofed attack by malicious RTP packets to succeed.

If rogue activity is detected 98, the method passes to analyze rogue allow window 100. Because some legitimate applications, such as some call center applications, can have different servers sending different RTP streams, NAT/NAPT device 30 can be configured to have an allowable rogue activity window during which rogue activity is allowed. If the rogue activity is detected past the allowable window shown by rogue allow window timer expired 102, a rogue detected window 104 is opened which has a timer to determine if the rogue activity continues. If the timer 118 expires, the method passes back to normal state 96. If further rogue activity is detected before the timer expires 106, a rogue detected message 108 is sent to a network administrator and the method passes to the rogue clear window 110 which includes another timer. As long as further rogue activity is detected 112 the method stays in the rogue clear window. If the rogue clear window timer expires 114, a rogue cleared message 116 is sent to the network administrator and the method returns to normal state 96.

Figure 7:
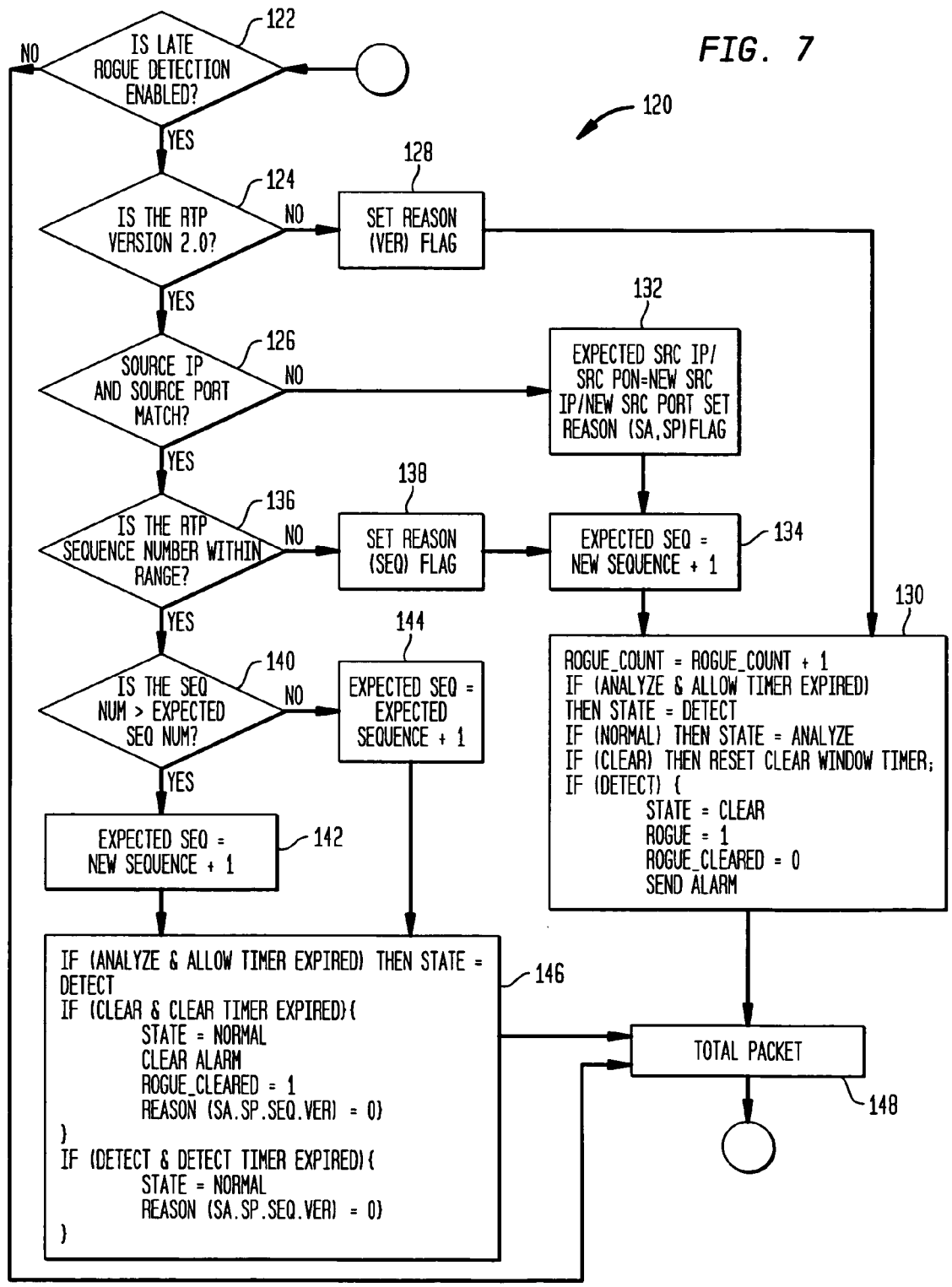
FIG. 7 is a flow chart showing a method of analyzing late rogue RTP packets in accordance with the present invention.

Referring now to FIG. 7 a method of analyzing rogue RTP packets is described. Method 120 begins by determining if late rogue detection is enabled when a new RTP packet is received on the pinhole being monitored. If late rogue detection is not enabled the method passes to block 148 where the packet counter is incremented and the method waits for the next RTP packet to be received. If late rogue detection is enabled, the method checks the RTP version number 124. If the version number is not 2.0 the method sets the version invalid flag 128 then increments the rogue packet counter, and sets the appropriate state and counter as shown by block 130, before incrementing the packet counter 148 and the method is returned to the wait state.

Returning to block 124, if the RTP version number is 2.0 the method checks to see if the IP source port and source address match the expected values. If the values do not match the new source address/port flag is set and the expected sequence number is incremented 134. The method then passes to block 130 to set the appropriate state and counters before the packet counter is incremented 148 and the method returns to the wait state.

Returning to block 126, if the source address and source port values match the expected values, the method then checks the sequence number to determine if it is in the expected range of values. If the sequence number is not within the range the invalid sequence number flag is set 138, the expected sequence number is incremented 134, and the appropriate state and timer are set 130. The method then increments the packet counter 148 and returns to the wait state.

Returning to block 136, if the sequence number of the packet is within the range of expected values, then the sequence number is checked to see if it matches the actual sequence number 140. If it does not match then the expected sequence number is incremented 144, or if it does match then the expected sequence number is set to (new sequence number +1) 142. From blocks 142 or 144, the method sets the state to normal, resets all the invalid flags and clears any alarms as required, block 146. The method then increments the packet counter 148, and returns to the wait state to wait for the next packet in the RTP stream. While references to particular identifying fields in a packet are shown, such as the sequence number with respect to block 136, one skilled in the art would recognize that other fields in the packet can be checked in addition to or instead of the fields described without departing from the scope of the present invention. Such additional fields could be fields such as the SSRC field, or fields relating to the audio or video codec being used by the known session.

Although particular references have been made to specific protocols such as SIP, H323, or MGCP, implementations and materials, those skilled in the art should understand that the present invention can function independent of protocol, and in a variety of different implementations without departing from the scope of the invention. Also, while reference is made to RTP as the bearer channel, the bearer channel could use any similar protocol such as secure RTP ("SRTP"), and secure RTCP, ("SRTCP"), and that any appropriate field, or combination of fields, in the header can be used to verify the authenticity of the traffic even if some fields specifically mentioned above, such as the sequence number, may not be applicable to every protocol.

Although the present invention has been described in detail, those skilled in the art should understand that they can make various changes, substitutions and alterations herein without departing from the spirit and scope of the invention in its broadest form.

We claim:

1. A method implemented by a network device for detecting rogue real time protocol ("RTP") packets, comprising:
   creating a pinhole for an RTP stream;
   detecting a signal to end the RTP stream;
   detecting that the pinhole is continuing to receive RTP packets after the signal to end the RTP stream; and
   after detecting that the pinhole is continuing to receive RTP packets after the signal to end the RTP stream, quarantining the pinhole until no more RTP packets are detected.

2. The method of claim 1 further comprising after quarantining, returning the pinhole to a free list to be reused once no more RTP packets are detected on the pinhole.

3. The method of claim 1 wherein the RTP stream is a bearer channel in a voice-over-Internet Protocol call.

4. The method of claim 1 wherein there is a control signal separate from the RTP stream.

5. The method of claim 1 wherein the pinhole is a port assigned by a firewall.

6. The method of claim 1 wherein the pinhole includes network address translation to anchor the RTP stream.

7. The method of claim 1 wherein the RTP stream is a bearer channel for a voice-over-Internet Protocol call using session initiation protocol messaging.

8. The method of claim 1 wherein the RTP stream is a bearer channel for a video session using a video codec.

9. A method implemented by a network device for detecting rogue real-time protocol ("RTP") packets in a network comprising:
   creating a pinhole for an RTP stream;
   detecting conflicting RTP packets in the RTP stream passing through the pinhole, the conflicting RTP packets originating from more than one source; and
   determining if a source of the conflicting RTP packets is inappropriate.

10. The method of claim 9 further comprising after determining, blocking inappropriate RTP packets.

11. The method of claim 9 further comprising after determining, sending an alarm to an operator identifying the inappropriate RTP packets.

12. The method of claim 9 wherein determining if a source of the conflicting RTP packets is inappropriate involves using source identifying information including the destination address, the destination port and the protocol.

13. The method of claim 9 wherein determining if a source of the conflicting RTP packets is inappropriate involves measuring the duration of inappropriate RTP traffic.

14. The method of claim 9 wherein determining if a source of the conflicting RTP packets is inappropriate involves using an RTP version number.

15. The method of claim 14 wherein the RTP stream is a bearer channel in a voice-over Internet-Protocol call, the call using session initiation protocol messaging.

16. The method of claim 9 wherein determining if a source of the conflicting RTP packets is inappropriate involves using the SSRC number of the RTP packets.

17. The method of claim 9 wherein determining if a source of the conflicting RTP packets is inappropriate involves looking at sequence numbers for the RTP packets.

18. The method of claim 9 wherein determining if a source of the conflicting RTP packets is inappropriate involves for audio RTP streams, looking at an audio codec.

19. The method of claim 9 wherein determining if a source of the conflicting RTP packets is inappropriate involves for video RTP streams, looking at an video codec.

* * * * *